United States Patent [19]
Naritomi

[11] Patent Number: 5,795,525
[45] Date of Patent: Aug. 18, 1998

[54] METHOD FOR ASSEMBLING A CONTROL PANEL OF AN ELECTRONIC APPARATUS

[75] Inventor: Masanori Naritomi, Chiba, Japan

[73] Assignee: Taisei Plas Co., Ltd., Tokyo, Japan

[21] Appl. No.: 623,826

[22] Filed: Mar. 29, 1996

[30] Foreign Application Priority Data

Jun. 9, 1995 [JP] Japan .................... 7-167990

[51] Int. Cl.⁶ .................... B29C 45/22; B29C 45/32; B29C 45/14
[52] U.S. Cl. .................... 264/251; 264/267; 425/120
[58] Field of Search .................... 264/255, 272.15, 264/272.11, 328.8, 161, 163, 273, 274, 251, 254, 267, 275; 425/120, 130

[56] References Cited

U.S. PATENT DOCUMENTS

| | | |
|---|---|---|
| 4,385,025 | 5/1983 | Salerno et al. |
| 4,459,256 | 7/1984 | Ziegler .................... 264/255 |
| 4,636,593 | 1/1987 | Novak et al. |
| 4,732,724 | 3/1988 | Sterner .................... 264/255 |
| 4,818,829 | 4/1989 | Nopper et al. |
| 5,333,379 | 8/1994 | Odaira et al. .................... 264/272.17 |

FOREIGN PATENT DOCUMENTS

| | | |
|---|---|---|
| 0 263 575 A2 | 4/1988 | European Pat. Off. |
| 0 615 265 A3 | 9/1994 | European Pat. Off. |
| 4-305418 | 10/1992 | Japan. |
| 2 190 245 | 11/1987 | United Kingdom. |

OTHER PUBLICATIONS

Nikkei Mechanical, May 29 1995, No. 455, pp. 53 and 55.

*Primary Examiner*—Angela Ortiz
*Attorney, Agent, or Firm*—Armstrong, Westerman, Hattori, McLeland & McLeland

[57] ABSTRACT

A method for assembling a control panel makes the quality of thin surface forming bodies constant, the bodies resiliently supporting buttons of the control panel body. The control panel body (previously formed) is inserted into a pair of mold plates. The mold plates form cavities in conjunction with the control panel body. The cavities are independent of from one another and are symmetrical with respect to an axis normal to the surface of the control panel. Melted elastomer is injected flows into the cavities and expands in the cavities. Such melted material and the melted hard materials of the control panel are co-melted and, when cooled, make a solid solution.

14 Claims, 11 Drawing Sheets

(a)

traced from photograph 1

(formed under higher pressure)

traced from photgraph (formed under lower pressure)

METHOD FOR ASSEMBLING A CONTROL PANEL OF AN ELECTRONIC APPARATUS

BACKGROUND OF THE INVENTION

1. Field of the Invention

The present invention relates to a method for assembling a control panel having a multiple of operating portions or push-buttons. More particularly, the present invention relates to a method for assembling a control panel of various personal apparatuses for domestic use, industrial machines, automobiles, computers, portable or cordless telephones, etc., especially where an injection process is utilized.

2. Description of the Related Arts

Various kinds of apparatuses have control panels (for example, NC-machines and portable or cordless telephones). It is expected that such panels will penetrate into broader fields. In particular, control panels of personal movable multi-media devices are required to prevent rain, dust or the like from penetrating or entering into the inside of the control panel and should be electrically insulated. Furthermore, such devices should be able to be mass-produced at low costs and include such characteristics.

The control panel of a personal movable multi-media device having various operations may be provided with an on-off switch-button to turn on/off the power supply, a timer switch-button used to set, for example, an operating time, and instruction buttons used to give operation instructions.

There are many mass-production arts known for producing control panels. For example, there are control panels wherein a thin film-like sheet made of resilient material is bonded to the inside or outside surface of the control panel body with many holes. Button bodies are bonded to the sheet at positions corresponding to the respective holes. This type of control panel is called a flat panel.

There are also control panels without any sheets, wherein the buttons are respectively bonded to the control panel body. In such a control panel, the buttons are respectively supported by the bonding means for bonding the buttons to the control panel body. Such supporting means is made of an elastomer or resilient material, being formed by means of injection. In the injection process, the supporting means is fusion-bonded to the control panel body.

According to the injection method, the supporting means is formed in the conical shape. Pushing the button supported by the conical shaped supporting means results in maximization of the differential coefficient of the stress with respect to time in the middle of the process, the peripheral portion of the conical portion of the supporting means bending at the point to overlap itself. In the middle of the process, the maximum stress allows a user to have a clicking feeling (a feeling called "click").

Such a clicking feeling is preferred by users. Silicon-rubber may be utilized for material, allowing the button to return back (for example, U.S. Pat. No. 4,818,829 and U.S. Pat. No. 4,636,593). In addition to silicon, various kinds of fusion-melting elastomers are known as such resilient material.

A control panel body has a lattice-like body surrounding the peripheral portions of many holes. Hard engineering plastics are conventionally used for such lattice-like body. Such materials are also known. The material of the lattice-like body should be easy to fusion-bond to selected hard engineering plastic. Such suitable materials are also known.

In order to generate the desired clicking feeling, a resilient supporting body should be formed from a thin portion or a flat portion combined with a curved portion. A control panel including such a thin curved portion is not flat, thereby a flat sheet can not be applied. When forming the control panel with injection means, it is difficult for the melted material to flow into the cavity corresponding to such thin portion, and thereby the flow is not isotropic. And, it is desirable that both the buttons and the supporting portions are formed by injection so that the cost is made lower. Especially in such one-body mold process, melting material is difficult to flow into the cavity for forming the thin portion.

Melted resilient material (for example, melted polyester elastomer, melted polyurethane elastomer, or melted olefin elastomer) have typical physical characteristics, having high viscosity and where their volume is greatly changed by pressure. Such characteristics results in a turbulent flow being generated in a high pressure condition in narrow spaces corresponding to a thin portion. Such turbulent flows are not able to give even density to each part of the thin portion.

Fusion-bonding of an elastomer to an engineering plastic resin demands an appropriate high pressure. FIG. 10(a) shows an abstract of an photograph taken by an electron microscope according to experiments. As can be seen, the fusion-bonding elastomer layer made by injection to an engineering plastic resin at an appropriate high pressure protrudes into an engineering plastic resin layer, like sea islands on a horizontal sectional plane as illustrated in FIG. 10(b) and like a rack-gear in a vertical sectional view as illustrated in FIG. 10(c). The above horizontal view is obtained by a chemical method where plastic resin of a fusion-bonded body formed by injection flowed away from the elastomer due to a solution. Such experiments teach that such fusion-bonding of an elastomer to an engineering plastic resin does not occur without an appropriate even pressure in the thin portion (having about 0.2 mm thickness).

As seen in the photograph shown by FIG. 12, the height of the main sea islands is estimated to be 1 micron to 10 microns. Further, the photograph shows a fine structure wherein many long fine protrusions protrude in a direction perpendicular to the main island. However, there is no structure similar to these sea island structures in a body formed under a lower pressure, as seen in the photograph shown by FIG. 13.

As mentioned above, a thin film formed by injected elastomer under the appropriate pressure is resiliently strong against repeated transformations. However, it has been found that there is a significant problem in the flow of the melted elastomer. Melted elastomers easily change their volume under different pressures. Such elastomers appear as if they were gasses, but they never follow Pascal's principle, thereby the pressure never uniformly changes. Such outstanding physical characteristics makes it difficult for melted elastomers to smoothly flow through a narrow cavity. This results in pressure falling at positions far from an injection gate. An excessively high pressure results in turbulence causing itself (pressure) to be non-uniform, thereby many faults (holes) are generated in the resulting body.

FIG. 11 abstractly illustrates an overlapping of two circularly expanding waves of high viscosity of elastomers in a closed wall frame W. The elastomers are injected out from the respective gate-points. Both elastomers are respectively expanding like circular waves at points A and B. Turbulence appears at an overlapping domain C where the two waves overlap. The domain C is not isotropic with respect to a line L. Such turbulence is caused by great spatial difference of density of the material having the above mentioned two physical characteristics. The turbulence does not allow the material to flow smoothly therein and results in a great decrease of the pressure in the turbulence area. Such a great decrease of the pressure causes defects in the thin film. Any defects are unacceptable in electronic apparatuses, such as those on an airplane.

SUMMARY OF THE INVENTION

An object of the present invention is to provide a control panel or a method for assembling a control panel enabling its cost to be lower for mass-production and lessening the number of manufacturing steps.

Another object of the present invention is to provide a control panel or a method for assembling a control panel having a clicking-feeling.

Still another object of the present invention is to provide a control panel or a method for assembling a control panel wherein buttons are light-penetrating.

A further object of the present invention is to provide a method for assembling a control panel wherein an isotropic flow is formed for forming a strong thin film.

A still further object of the present invention is to provide a method for assembling a control panel wherein a thin film is well-fusion-bonded to a casing body.

Melted material flows into and expands in respective independent cavities, forming in each cavity, sheet-like thin body portions that surround respective movable portions, movable in a direction perpendicular to the control panel body, under the appropriate conditions of temperature and pressure thereof. This cavity forms additional portions besides the thin portions only. The material isotropicly expands in the curved cavity for forming the thin and thick portions. The fusion-bonding portion is formed as one-body where thermoplastic elastomer and other resins are melted together and when cooled formed as one solid solution body like sea islands in the molecular layer.

Each independent isotropic flow is able to avoid turbulence in each closed cavity formed of a mold wall and a surface of a casing body. This casing body forms a portion of a frame filled with melted material. A solution body is formed like sea islands on the inner surface of the frame, on which a high pressure is able to be preserved. That is, the material forming the wall forms in itself a fusion bonding layer.

DETAILED DESCRIPTION

Figure 1:
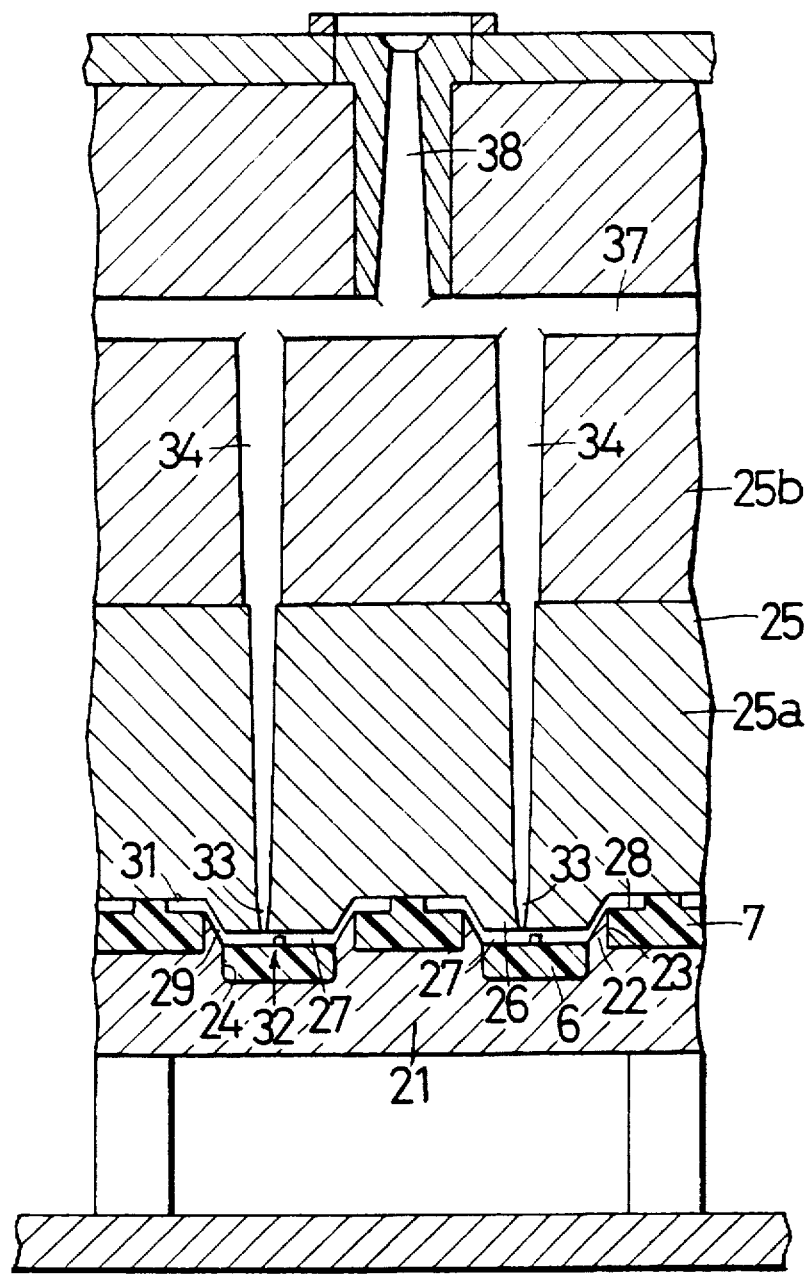
FIG. 1 is a sectional view of the first embodiment according to the present invention.
Figure 2:
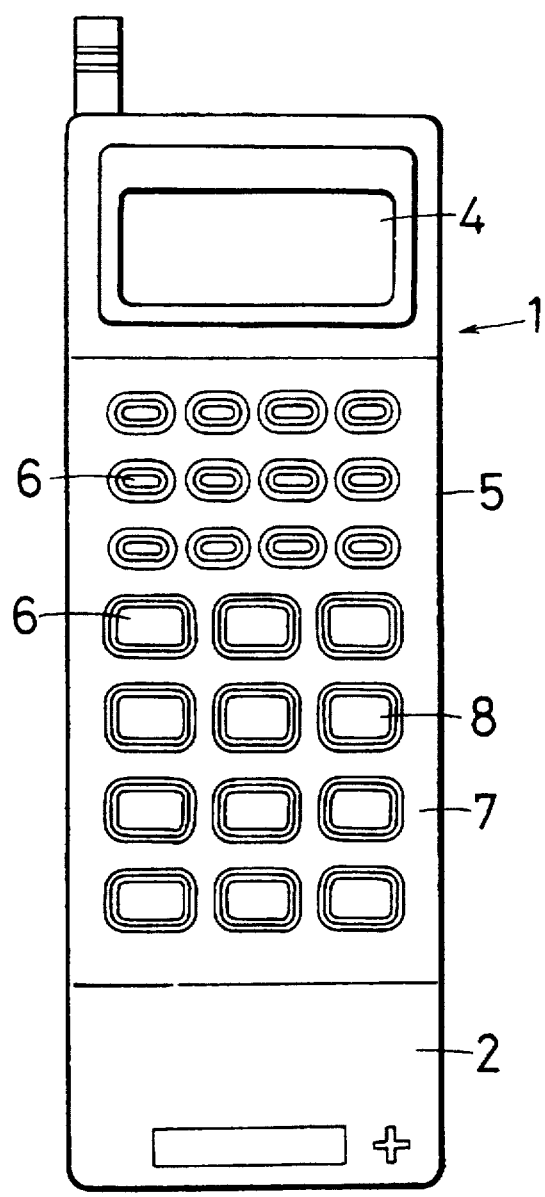
FIG. 2 is a horizontal view of a portable telephone apparatus of the first embodiment according to the present invention.

FIG. 1 illustrates the first embodiment of the present invention of a method of assembling a control panel. FIG. 2 shows a portable telephone apparatus 1 made according to the first embodiment. A telephone body 5 includes a sending-and-receiving portion 2, a control panel portion 3 and display portion 4. Control panel portion includes a control panel body 7 and operating control panel portion 8.

Figure 3:
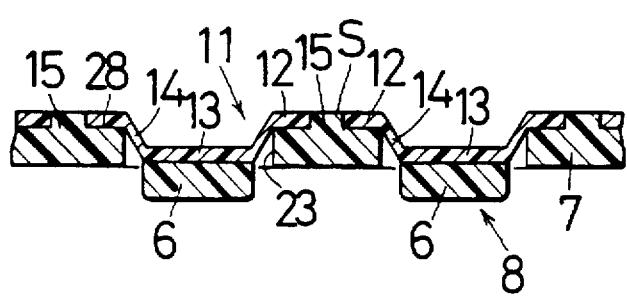
FIG. 3 is a partial horizontal view of a control panel assembled by a method of the first embodiment according to the present invention.

FIG. 3 illustrates a part of the control panel of the movable telephone apparatus 1 assembled by the method for assembling a control panel according to the first embodiment of the present invention. Control panel body 7 is a part of the telephone body 5, that is, a casing of the telephone body 5. Control panel body 7 is made of conventional hard engineering plastic resin, for example, PP (propylene), EVA (ethylene-vinyl acetate), PC (polycarbonate), etc., that are conventionally used as casing materials. Operating control panel portion 8 is a set of buttons including a multiple of push-buttons or surface forming portions 6. As illustrated in FIG. 3, each of the surface forming portion 6 includes a movable portion movable in the direction generally perpendicular to the surface of the control panel portion 3.

Each button 6 is resiliently supported on the control panel body 7 so as to move in the direction generally perpendicular to the surface of the telephone body 5. Push-buttons are disk-like in the shape. The respective push-buttons may be independently or individually inserted into the respective button inserting holes 23 located on the lattice. Each push-button includes a projecting portion to which a finger touches. Such a projecting portion may be made of a hard material. A push button occasionally may be shaped so that it is not clearly identifiable as a push button. The push-button body is hereafter referred to as movable portion or surface forming portion 6 in this specification.

As shown in FIG. 3, each surface forming portion 6 is resiliently and supportably mounted on the control panel body 7 through sheet-like body or surface-forming thin body 11. Operating control panel 8 includes a set of pairs of one surface forming portion 6 together with one surface-forming thin body 11. One surface forming thin body 11 is formed as a single thin layer and resiliently supports the peripheral portion of the surface forming portion 6 against control panel body 7.

In this embodiment, the surface-forming thin body 11 includes a first fusion-bonded portion 12 fusion-bonding to the inside surface of the control panel body 7, a second fusion-bonding portion 13 fusion-bonded to the inside surface of the surface forming portion 6 and a bevel surface forming portion 14 continuously connecting the first fusion-bonding portion 12 and the second fusion-bonding portion 13. The second fusion-bonding portion 13 is located to protrude towards the exterior, away from the first fusion-bonding portion 12.

Each surface of each bevel surface forming portion 14 is conical in shape. Such a surface supports all of the peripheral portions of the surface forming portion 6. First fusion-bonding portion 12 has a ring-like shape. Second fusion-bonding portion 13 has a disk-like shape. First fusion-bonding portion 12, second fusion-bonding portion 13 and bevel surface forming portion 14 are formed in one body.

The neighboring first fusion-bonding portions 12 are perfectly divided by part 15 of the lattice of the control panel body 7. The neighboring first fusion-bonding portions 12 may be imperfectly divided by a part 15 of the lattice of the control panel body 7, that is, they may be connected with each other as described below.

Figure 4:
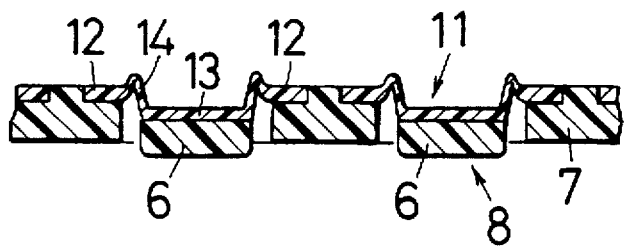
FIG. 4 is a sectional view for showing operation of buttons.

FIG. 4 shows that the surface forming portion 6 is inwardly pushed down. The conical bevel surface forming portion 14 is bent and overlaps itself. The time-derivative of the force in the process of the reform suddenly becomes maximum at a given time. When the pressure for pressing the push-button is released, the surface forming portion 6 instantly returns back to its original position as shown in FIG. 3. This motion gives a finger a clicking-feeling.

Surface-forming thin body 11 is made of resilient material. Such resilient material may be thermoplastic resin having rubber-like resilience. Such thermoplastic resin may be selected in the group of polyester elastomer, nylon elastomer, polyurethane elastomer, olefin elastomer and the like. On occasion, when material of control panel body 7 is made of ABS resin, polyester elastomer is selected because it strongly fusion-bonds to ABS resin. Hard thermoplastic resin is selected when it is desired that the resulting product be hard. The thickness of the surface-forming thin body 11 is desirably 0.2 mm to 0.3 mm.

The thickness of the part of bevel surface forming portion 14 may differ from each other. The thickness of the part connecting to the first fusion-bonding portions 12 may be larger than that of the middle part of the first fusion-bonding portion 12.

Referring to FIG. 1, an assembling method of assembling a control panel shown in FIG. 3 is described in what follows. FIG. 1 illustrates a three plate type of injection mold. A control panel body 7 has been already made of ABS resin in another process. A movable molding plate 21 includes lattice-like projection 22. Lattice-like projection 22 is inserted into button inserting holes 23. Movable molding plate 21 has button body inserting holes 24 into which surface forming portions 6, that is, the button body parts, are inserted.

Control panel body 7 has grooves 28 ring-like in the shape corresponding to the first fusion-bonding portion 12 of the surface-forming thin body 11 referred to in FIG. 3. A fixed molding plate 25 is mounted against the movable molding plate 21. Fixed molding plate 25 includes a multiple of cones 2b, conical in shape, on the lower side thereof. A space 27, disk-like in the shape, corresponding to the second fusion-bonding portion 13 of the surface-forming thin body 11, is provided between the lower surface of the fixed molding plate 25 and the upper surface of the surface forming portion 6.

A space 29, disk-like in the shape, corresponding to the second fusion-bonding portion 13 of the surface-forming thin body 11, is provided between the conical surface of the cone 26 and the conical surface of the movable molding plate 21. A space 31, corresponding to the first fusion-bonding portion 12, is provided between the lower surface of the fixed molding plate 25 and the groove surface of the grooves 28 (shown in FIG. 3). Space 27, space 29 and space 31 form cavity 32, corresponding to surface-forming thin body 11.

A plurality of cavities are provided, each cavity 32 being independent of each other, each corresponding to a respective surface-forming thin body 11. A gate 33 is opened on the inside surface of a fixed molding plate 25. Each gate 33 connects at or near the middle position of each space 27 of each cavity 32.

Each of the gates 33 may be opened independently of each other. Each cavity 32 (formed by the movable molding plate 21, the fixed molding plate 25, surface forming portion 6 and control panel body 7) corresponds to the surface-forming thin body 11 and is generally symmetrical with respect to an axis. Each gate may be generally located along the axis of the symmetry, or may be located a short distance away from the axis of symmetry.

A single gate 33 is provided to correspond with a single surface-forming thin body 11. Subrunners 34 connected to respective gates 33, are provided in the fixed molding plate 25. Upper ends of one group of the subrunners 34 connect to one runner 37. Upper ends of another group of the subrunners 34 connect to another runner 37. Each runner 37 connects to a single injection mouth 3B. Subrunners 34 and runners 37 have material-flowing passages of a considerably large diameter. The diameter of one runner 37 differs in diameter from the diameter of another runner 37 so that the flow quantity of the subrunners 34 equal each other.

Figure 10:
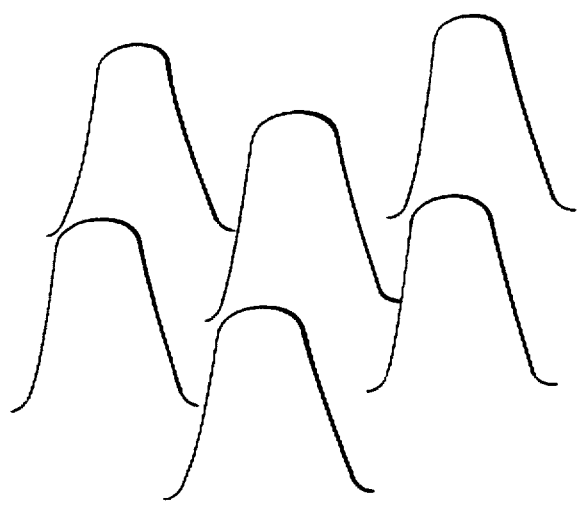
FIG. 10(a) is a perspective view of a known solution body.
FIG. 10(b) is a horizontal sectional view of FIG. 10(a).
FIG. 10(c) is a vertical sectional view of FIG. 10(a).
Figure 10:
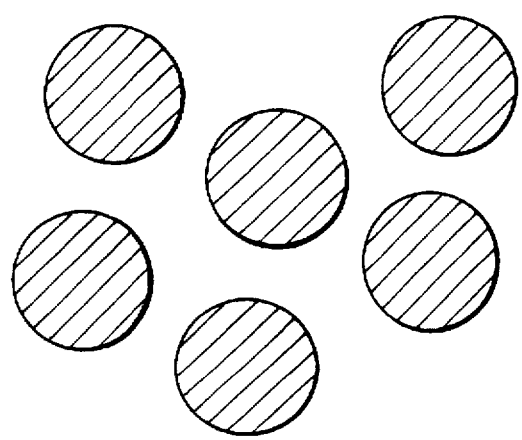
Figure 10:
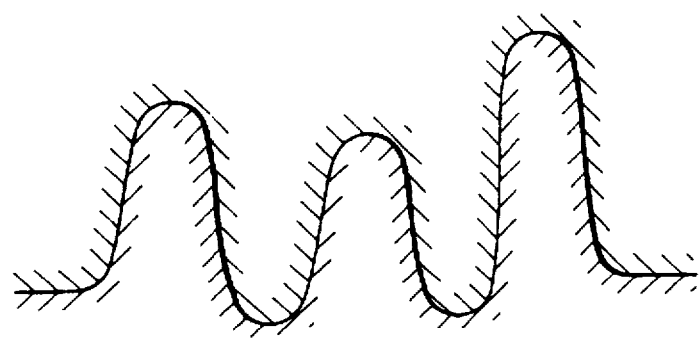
Figure 11:
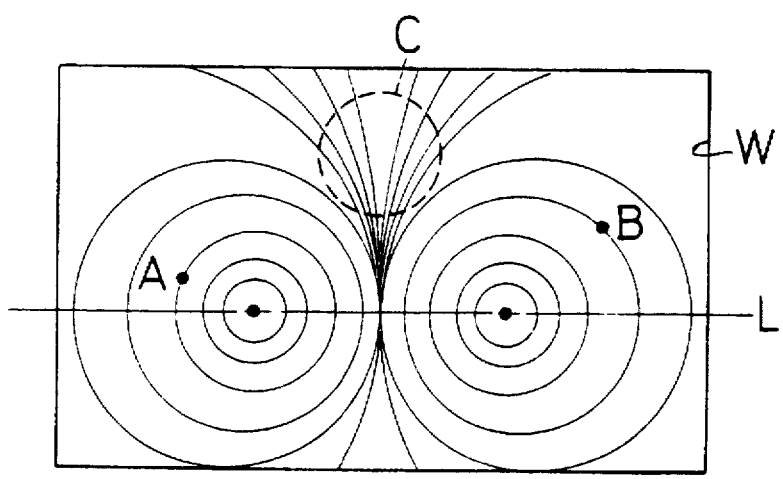
FIG. 11 is an abstract view of non-isotropy.
Figure 12:
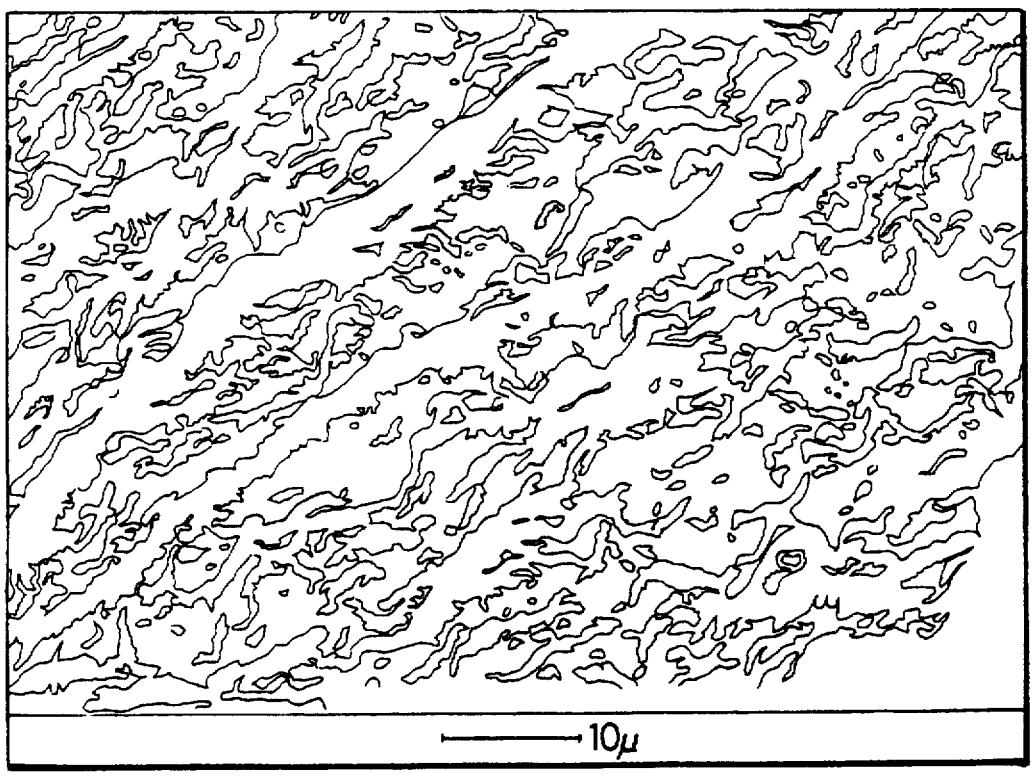
FIG. 12 is a perspective view of sea islands like surface of a melted fusion-bonding layer according to the present invention.
Figure 13:
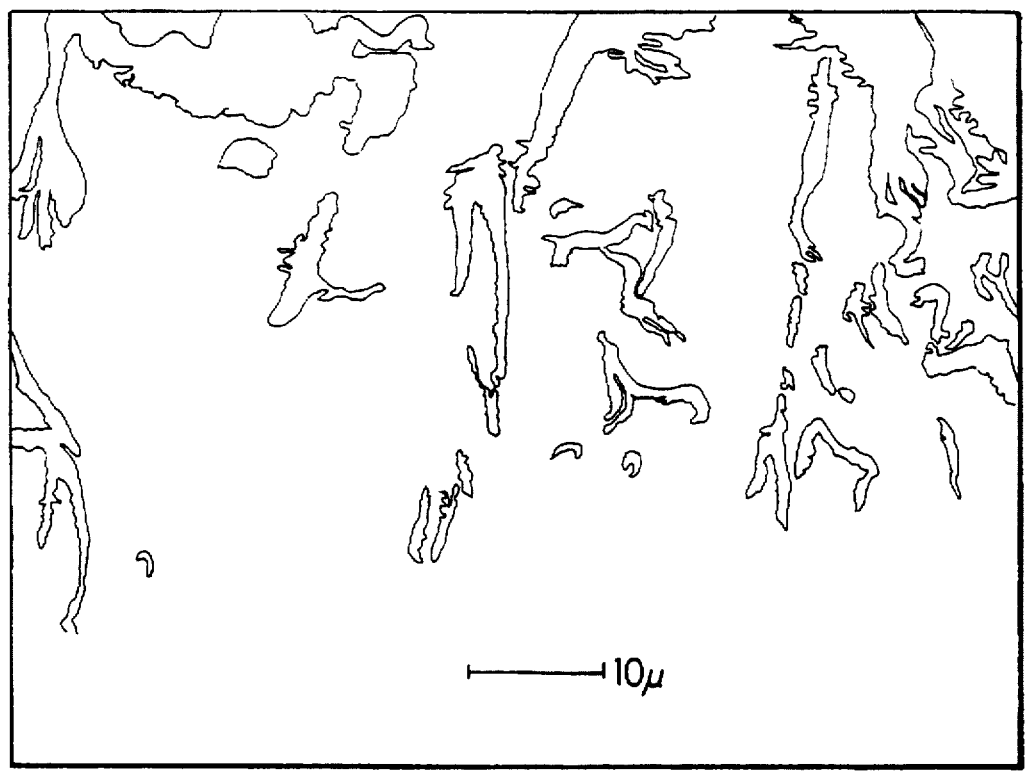
FIG. 13 is a perspective view of a surface of a connecting layer made by a conventional method of injection.

Melted resilient material, injected from the injection mouth, is divided and flows into the main branch 38, runners 37 subrunners 34. The melted resilient material flows into the respective cavities 32 at the same rate under the same conditions of temperature and pressure. This results in the melted material flowing to the respective cavities at the same velocity. Such material flows into and isotropicly expands in space 27, and then isotropicly flows into space 29 and then isotropicly into the space 31. Such isotropy does not generate turbulence, thereby pressure reaches the end of each independently closed cavity, in a manner approaching Pascal's principle in theory. At the end surface, the melted material is fusion-bonded to the casing material under the sufficiently high pressure. Such isotropy allows the material to perfectly and entirely fill the cavities. In such injecting and flowing processes, micro-bubbles may be generated and incorporated into the cavities. Such micro-bubbles float upwardly in the melted material and reach the upper portion of the cavity. Such bubbles reaching at the end of cavity do not substantially give any defect to the fusion-bonding layer. Such isotropy enables fusion-bonding like sea islands as shown in FIG. 10(a), (b), (c) on the peripheral end surface.

Movable molding plate 21 may be a lower molding plate, while fixed molding plate 25 may be an upper molding plate. Bubbles flow from the second fusion-bonding portion 13 into the bevel surface forming portion 14 and ascend at a higher speed in the bevel surface forming portion 14, collecting near the peripheral end of the first fusion-bonding portion 12.

Melted polyester elastomer resin flowing into the space 27 melts the surface layer of the surface forming portion 6. This melting creates a layer where the melted polyester and the melted ABS-resin (of the surface forming portion 6) are mixed with each other, the resulting mixed layer having a thickness of at least one molecular size. Cooling both of the materials makes them a solid solution, resulting in a fusion-bonded layer formed of the polyester elastomer resin and the ABS-resin.

Figure 8:
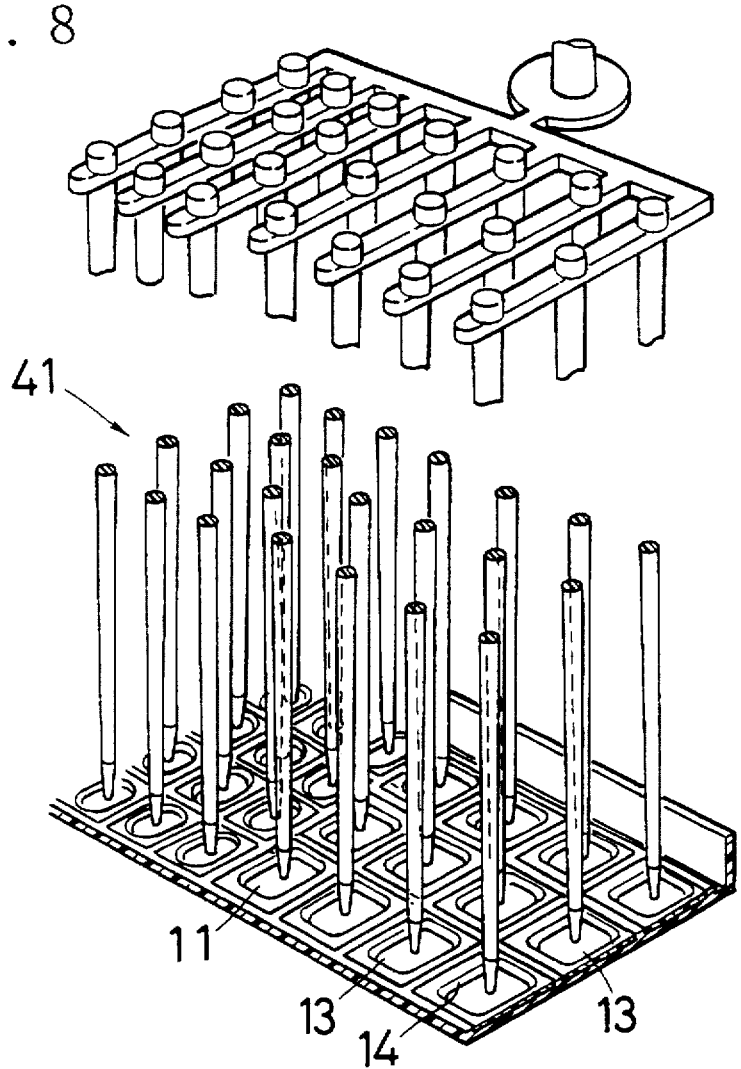
FIG. 8 is a perspective view of a process of the first embodiment.

As illustrated in FIG. 1, fixed molding plate 25 may be divided into a two-piece type of structure. The fixed molding plate 25 may be driven to allow the upper part 25b to move upwardly and keep the lower part 25a fixed. As shown in FIG. 8, when the polyester elastomer resin has been cooled in gates 33, subrunners 34 and runners 37 a "forest-like body" results, each "tree" of the "forest-like body" extending vertically from the surface-forming thin body 11 of the point of the gate opening. Each "tree" of the "forest-like" body 41, corresponding to a respective gate 33, is easily cut apart from the respective fusion-bonding portions 13 (of the surface-forming thin body 11). After the "forest-like" body 41 has been removed from the surface-forming thin bodies 11, the upper portion 25b of molding plate 25 is replaced. The fixed molding plate 25 has a sufficient thickness. Such thickness prevents any bending of the mold, thereby the thin portion is well-formed. Division of the mold 25 enables the "forest-like body" to be removed from the thin portion.

The "forest-like" body 41 may be recycled for another injection process or otherwise thrown away. A "tree" of the "forest-like" body 41 is greatly larger in volume than a surface-forming thin body 11. This method to generate "forest-like" body 41 may result in higher costs in production, but results in a higher quality of productions with respect to the resilience and strength of the surface-forming thin body because of the independence of the surface-forming thin body 11.

Figure 5:
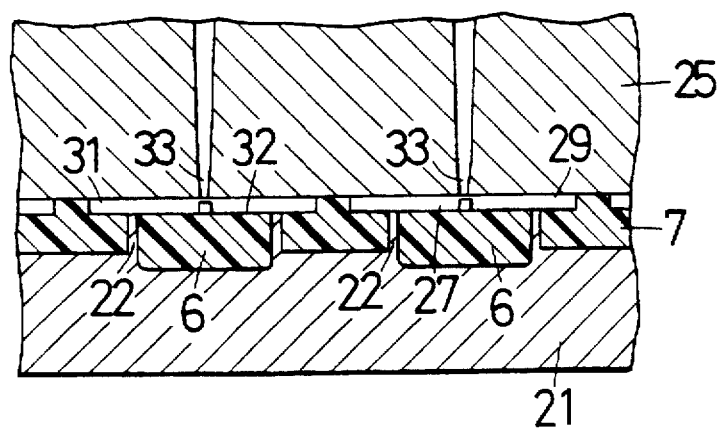
FIG. 5 is a sectional view of the second embodiment according to the present invention.

FIG. 5 illustrates a method of assembling a control panel according to the second embodiment of the present invention. The surface-forming thin body 11 of the second embodiment is different from the surface-forming thin body 11 of the first embodiment in that the surface-forming thin body 11 of the first embodiment has a conical portion, while the surface-forming thin body 11 of the second embodiment has no conical portion and is flat.

A space 27, disk-like in the shape, corresponding to the second fusion-bonding portion 13 of the surface-forming thin body 11 is provided between the lower surface of the fixed molding plate 25 and the upper surface of the surface forming portion 6. A space 29, disk-like in the shape, corresponding to the second fusion-bonding portion 13 of the surface-forming thin body 11, is provided between the lower surface of the fixed molding plate 25 and the upper surface of the lattice-like projection 22 of the fixed molding plate 25.

A space 31, corresponding to the first fusion-bonding portion 12, is provided between the lower surface of the fixed molding plate 25 and the groove surface of the grooves 28 of the control panel body 7. Space 27, space 29 and space 31 form cavity 32 corresponding to surface-forming thin body 11. Each cavity 32 is independent of each other, each cavity 32 corresponding to one surface-forming thin body 11.

A gate 33 is opened on the inner surface of the fixed molding plate 25. Each gate 33 connects at the middle position of a corresponding space 27 of each cavity 32. Each cavity 32 (formed by the movable molding plate 21, fixed molding plate 25, surface forming portion 6 and control panel body 7) is generally symmetrical with respect to an axis in each cavity. Each gate is generally located along the axis of symmetry. Alternatively, each gate may be located a short distance away from the axis of symmetry.

The operation of the second embodiment decreases a clicking-feeling, but increases a resilience-feeling in the resulting product. The assembling process of the second embodiment is almost the same as that of the first embodiment. The respective bonding portions between the surface forming portions 6, surface-forming thin bodies 11, the respective bonding portions between the control panel bodies 7 and surface-forming thin bodies 11 are formed of a fusion-bonding layer, as in the first embodiment.

Figure 6:
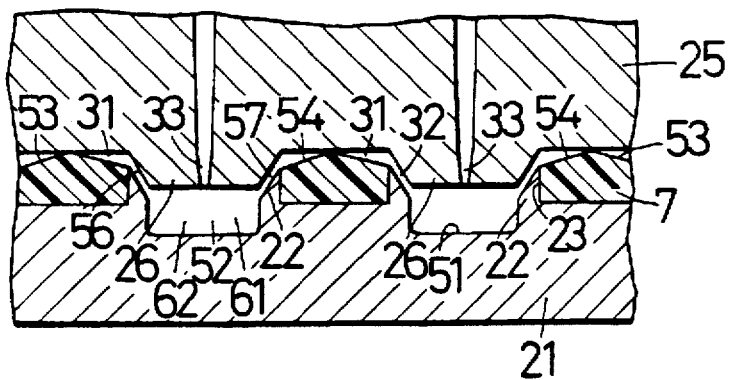
FIG. 6 is a sectional view of the third embodiment according to the present invention.

As in the first and second embodiment, a control panel, to be assembled by a method according to the third embodiment of the present invention, comprises a control panel body 7 mounted on an electro-apparatus body and a set of push-buttons mounted on the control panel 7. The set of push-buttons includes a plurality of movable portions 6 independently movable in the direction perpendicular to the panel surface of the control panel body 7. The set of push-buttons further includes surface-forming thin bodies 11 for resiliently supporting the peripheral portions of the movable portions 6. FIG. 6 shows a method for assembling a control panel according to the third embodiment. Control panel body 7 has been formed in a previous process. A movable molding plate 21 has island-like grooves. Island-like conical portions 26 provided on the lower surface of the fixed molding plate 25. Cylindrical projections 22 are provided on the movable molding plate 21, distributed like islands. Projections 22 are respectively inserted into button inserting holes 23 of the control panel body 7.

A space 52, corresponding to the surface forming portion 6, is provided by the conical portions 26, the groove 51 and the lattice-like projection 22. The second fusion-bonding portion 13 in the first embodiment separately exists apart from the push-button body, unlike this embodiment; the push-button body of the third embodiment is the same as the second fusion-bonding portion 13. Space 27, space 29 and space 31 form one cavity 32, corresponding to surface-forming thin body 11. Each cavity 32 is provided independently of another cavity 32, each corresponding to one surface-forming thin body 11.

A gate 33 opens to the inside surface of a fixed molding plate 25. Each gate 33 connects at or near the middle position of each space 27 of each cavity 32. Ring-like space portions 53, corresponding to the first fusion-bonding portion 12 of the surface-forming thin body 11, are provided on the control panel body 7. Space 31 is formed by the surface of the fixed molding plate 25 and the lower surface of the lacking portion 53. Space 31 is similar to that of the first embodiment in the respect that it is ring-like in shape, but is different from that of the first embodiment in the respect that it is needle-like in cross section.

Space 57 corresponds to the bevel surface forming portion 14 of the surface-forming thin body 11, being formed by the bevel surface 55 of the lattice-like projection 22 and the conical surface 56 of the conical portions 26. Spaces 27 and 57 form cavity 32, corresponding to the surface-forming thin body 11. Space 52 forms cavity 62, corresponding to the surface forming portion 6. Cavity 32 and the cavity 62 together form cavity 61. A number of such cavities are provided to correspond to the number of the buttons.

Gates 33 connect at or near the middle of the cavity 61 provided on the fixed molding plate 25. Each gate 33 is provided to correspond to a respective cavity 61. The third embodiment is similar to the first and second embodiments in that one gate is independent of another gate. The opening of one of the gates 33 is independent of opening another of the gates 33.

Each cavity 32 (formed by the movable molding plate 21, fixed molding plate 25, surface forming portion 6 and control panel body 7) is generally symmetrical with respect to an axis through each cavity. Each gate is generally located along the axis of the symmetry. Alternatively, each gate may be placed a short distance away from the axis of symmetry. Each cavity 32 (formed by the movable molding plate 21, fixed molding plate 25, surface forming portion 6 and control panel body 7) is generally symmetrical with respect to the axis through each cavity.

As in the first embodiment, subrunners 34 are connected to the respective gates 33, provided in the fixed molding plate 25. The respective upper ends of one group of the subrunners 34 connect to one runner 37 (not shown). The respective upper ends of another group of the subrunners 34 connect to another runner 27. Such runners 27 connects to single injection mouth (not shown). Subrunners 34 and runners 37 have respective material-flowing passages of a considerably large diameter. The diameter of one runner 37 differs in diameter from the diameter of another runner 37 so that the flow quantity of each subrunner 34 equals each other subrunner 34.

Melted resilient material injected from the injection mouth is divided and flows into a main branch 38 (not shown), runners 37 and subrunners 34. The melted resilient material flows into the respective cavities 32 at the same rate under the same conditions of temperature and pressure. Such a flowing of the melted material results in flows in the respective cavities at the same velocity. Such material flows and isotropicly expands in the space 27, and then isotropicly flows into the space 29. Such material flows and isotropicly expands in the space 29, and then isotropicly flows into the space 31. Such isotropy allows material to perfectly and entirely fill the cavities. In such injecting and flowing processes, micro-bubbles are generated and are incorporated into the cavities.

Figure 7:
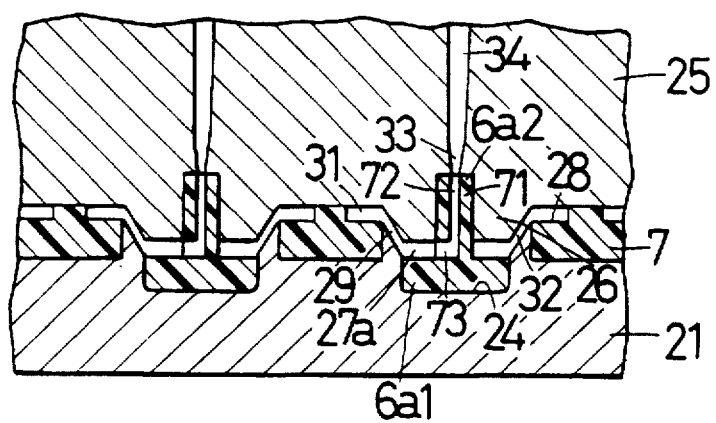
FIG. 7 is a sectional view of the fourth embodiment according to the present invention.

As in the first and second embodiment, a control panel 3 to assembled by the method according to a fourth embodiment of the present invention comprises a control panel body 7 mounted on an electronic apparatus body and a set of push-buttons mounted on the control panel body 7. The set of push-buttons includes a plurality of movable portions 6a independently movable in the direction perpendicular to the panel surface of the control panel body 7. The set of push-buttons also includes a plurality of surface-forming thin bodies 11 for resiliently supporting the peripheral portions of the movable portions 6. FIG. 7 shows a method for assembling a control panel according to the fourth embodiment. Control panel body 7 has been formed in the previous process. A movable molding plate 21 has island-like projections 22. Island-like projections 22 are provided on the movable molding plate 21. Projections 22 are respectively inserted into button inserting holes 23 of the control panel body 7.

Movable molding plate 21 has button body inserting holes 24 into which the respective surface forming portions 6a (that is, the respective parts of the respective button bodies) are inserted.

Differing from the first embodiment, push-button 6a includes a head portion 6a1 and a neck portion 6a2. Control panel 7 has ring-like grooves 28 corresponding to first fusion-bonding portion 12 of the surface-forming thin body 11 illustrated in FIG. 3.

There are cone-like portions provided in the lower surface of the fixed molding plate 25 distributed as islands. A ring-like space 27a, corresponding to the second fusion-bonding portion 13 of the surface-forming thin body 11, is provided between the lower surface of the conical portions 26 and the upper surface of the surface forming portion 6. A conical space 29 is provided between the conical surface of the conical portions 26 and the conical surface of the movable molding plate 21. A space 31, corresponding to the first fusion-bonding portion 12, is provided between the lower surface of the fixed molding plate 25 and the groove surface of the grooves 28 (shown in FIG. 3).

Grooves 71, corresponding to the neck portion, are formed in the lower side. Space 27a, space 29 and space 31 form one cavity 32, corresponding to a surface-forming thin body 11. Each cavity 32 is independent of each other cavity 32, each cavity 32 corresponding to one surface-forming thin body 11. A gate 33 opens on the inside surface of the fixed molding plate 25. Each gate 33 connects at the middle position of each space 27 of each cavity 32. A runner-in-button 72 runs in the axial direction of the button. Runner-in-button 72 has a melted resilient material entrance on its lower surface (the upper surface in FIG. 7) of the neck portion 6a2 of the button body 6a and a melted resilient material exit at the juncture of neck portion 6a2 and head portion 6a1.

Runner-in-button 72 extends in the downward direction in its exit in communication with space 27a. The gate 33, the lower portion of the subrunner, communicates with the lower end of the runner-in button 72. Each cavity (formed by the movable molding plate 21, fixed molding plate 25, surface forming portion 6 and control panel body 7) is generally symmetrical with respect to an axis of each cavity. Each gate is generally located along the axis of the symmetry.

The melting resilient material flows into the respective cavities 32 at the same rate under the same conditions of temperature and pressure. Such a flowing of the melted material results in flows in the respective cavities at the same velocity. Such material flows and isotropicly expands in the space 27, and then isotropicly flows into the space 29 expands in the space 29, and then isotropically flows into the space 31.

Such isotropy allows the material to perfectly and entirely fill the cavities. In such injecting and flowing process, micro-bubbles are generated and are incorporated into the cavities. The bubbles flowing from the second fusion-bonding portion 13 in to the bevel surface forming portion 14 ascend at a higher speed in the surface forming portion 14, and collect near the peripheral end of the first fusion-bonding portion 12.

Figure 9:
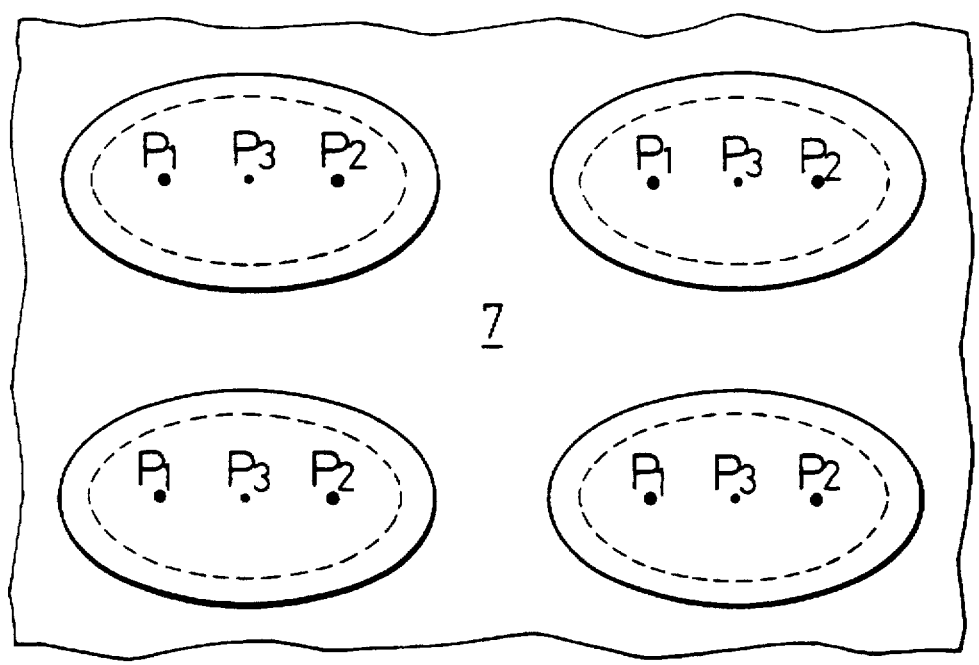
FIG. 9 is a horizontal view of an aspect of isotropy.

FIG. 9 abstractly illustrates another aspect of isotropy. Buttons are parabolic or elliptical in shape. Positions of gates are indicated by points P1 and P2. Along a virtual line of symmetry is a point P3. Point P3 is in the middle between the points P1 and P2. Points P1 and P2 respectively corresponds to the focuses of the ellipse. Each flow in each cavity expands from the two points to the peripheral ends. The two waves of flows overlap, but the isotropy of the flow does not break.

What is claimed:

1. A method for assembling a control panel, the panel including a control panel body and a set of buttons of an electronic apparatus, the method comprising:

mounting said set of buttons on said control panel body, each button of said set of buttons including a movable portion independently moving in the direction perpendicular to an exterior surface of said control panel body, and a surface forming thin portion connected to said control panel body, resiliently supporting said movable portion on said control panel body at a peripheral portion of said movable portion, said mounting step including the sub-steps of forming a plurality of cavities, defined by an upper mold, a lower mold, the control panel body located on the lower mold and the plurality of movable portions located on the lower mold, each of the plurality of cavities corresponding to a surface-forming thin portion of a button of said set of buttons;

injecting a resilient material independently into each of said plurality of cavities through a plurality of gates in said upper mold, each of said cavities having at least one gate opening of a gate in the portion of the upper mold defining the cavity at a location corresponding to one of said plurality of movable portions;

isotropically flowing said resilient material throughout each of said plurality of cavities, from each of said movable portions to the control panel body, thereby creating said surface-forming thin portion; and fusion-bonding said surface forming thin portion to said control panel by melting a part of said control panel in contact with said surface-forming thin portion;

wherein said flowing step includes flowing bubbles formed in said resilient material from said movable portions, through said surface-forming thin portion, to the control panel body.

2. The method for assembling a control panel of an electronic apparatus of claim 1, wherein said surface forming thin portion is substantially symmetric with respect to an axis perpendicular to said control panel.

3. The method for assembling a control panel of an electronic apparatus of claim 2, wherein each gate is located on said axis.

4. The method for assembling a control panel of an electronic apparatus of claim 3, wherein said surface-forming thin portion is conical in shape.

5. The method for assembling a control panel of an electronic apparatus of claim 4, wherein said surface-forming thin portion has a fusion-melting-bonded portion which bonds to said control panel body on an inside surface of the control panel body, and a bevel surface portion continuously connected to said fusion-melting-bonded portion, said bevel surface extending in a direction toward the outside surface of said control panel body from said inside surface of said control panel body.

6. A method for assembling a control panel of an electronic apparatus comprising:

forming a control panel body defining a plurality of holes corresponding to movable portions of said control panel, inserting said control panel body formed in the forming step into a mold, forming a multiple of cavities with said mold and said control panel body, said cavities being substantially independent of each other, independently injecting resilient material into said cavities at locations corresponding to said plurality of holes at said control panel body, and independently flowing said material in each of said cavities, and respectively forming surface-forming thin portions with said resilient material independently flowing and expanding in the respective cavities and respectively fusion-bonding said surface-forming portions to said control panel body at fusion bonded portions, said flowing being isotropic in each of said cavities, wherein bubbles formed in said resilient material rise away from each of said plurality of holes defined by said control panel body to collect at a peripheral end of corresponding ones of said fusion-bonded portions.

7. The method for assembling a control panel of an electronic apparatus of claim 6, wherein said cavities are substantially symmetric with respect to respective axes perpendicular to said control panel body.

8. The method for assembling a control panel of an electronic apparatus of claim 7, wherein respective gates connecting to said cavities are respectively and substantially located on said axes.

9. The method for assembling a control panel of an electronic apparatus of claim 8, wherein said surface-forming portions are conical in the shape.

10. The method for assembling a control panel of an electronic apparatus of claim 9, wherein the step of forming surface-forming thin portions includes a process in which neighboring materials flow into the common peripheral portions of the neighboring cavities.

11. A method for assembling a control panel of an electronic apparatus comprising:

forming a control panel body defining a plurality of holes corresponding to movable portions of said control panel, inserting said control panel body into a mold, forming a multiple of cavities with said mold and said control panel body, said cavities being substantially independent of each other, independently injecting resilient material into each of said cavities through a set of gates and independently flowing said material in each of said cavities so that said material independently reaches wall surfaces of said control panel body under a condition in which the pressures at said wall surfaces are even, said wall surfaces forming each of said cavities, respectively forming surface-forming thin portions of said resilient material by independently flowing and isotropically expanding said resilient material in the respective cavities and respectively fusion-bonding said surface-forming portions to said control panel body at fusion-bonded portions, each of said surface-forming thin portions including a layer of fusion-bonding closed in a circumferential direction, and wherein each unit of said cavities is symmetric with respect to a respective axis of symmetry, in each cavity, said material symmetrically expands with respect to said respective axis and reaches at said wall surfaces at even pressure, said set of gates are connected to a common carrier, and wherein bubbles formed in said resilient material rise away from each of said plurality of holes defined by said control panel body to collect at a peripheral end of corresponding ones of said fusion-bonded portions.

12. The method of assembling a control panel of an electronic apparatus of claim 1, wherein said flowing step includes allowing bubbles formed in said resilient material to rise due to gravity from said movable portions, through said surface-forming thin portion, to the control panel body.

13. The method of assembling a control panel of an electronic apparatus of claim 5, wherein said flowing step includes allowing bubbles formed in said resilient material to flow from said movable portions through said surface-forming thin portion, to collect near a peripheral end of the fusion-melting-bonded portion.

14. The method of assembling a control panel of an electronic apparatus of claim 1, wherein said control panel body includes conically shaped interior surface portions, facing away from said lower mold, and wherein said flowing step includes allowing bubbles formed in said resilient material to flow from said movable portions through corresponding surface-forming thin portions, to collect near an apex of corresponding conically shaped interior surface portions.

* * * * *